Aug. 22, 1961 A. MACOVSKI 2,997,538

KEYED AUTOMATIC GAIN CONTROL AND DETECTOR CIRCUIT

Filed April 1, 1955 2 Sheets-Sheet 1

INVENTOR.
ALBERT MACOVSKI
BY
[signature]
ATTORNEY

KEYED AUTOMATIC GAIN CONTROL AND DETECTOR CIRCUIT

Filed April 1, 1955 2 Sheets-Sheet 2

INVENTOR.
ALBERT MACOVSKI
BY
[signature]
ATTORNEY 2,997,538
Patented Aug. 22, 1961

2,997,538

KEYED AUTOMATIC GAIN CONTROL AND DETECTOR CIRCUIT

Albert Macovski, New York, N.Y., assignor to Radio Corporation of America, a corporation of Delaware Filed Apr. 1, 1955, Ser. No. 498,498
8 Claims. (Cl. 178—7.5)

The invention relates to automatic gain control (AGC) and demodulator circuitry for television receivers, and it particularly pertains to a keyed or gated AGC network of the type wherein a triode vacuum tube having the cathode and grid electrodes connected as a diode detector is also arranged to develop the AGC voltage at the anode electrode.

Automatic control of the gain of the radio frequency (R-F) or intemediate frequency (I-F) amplifying circuits in a television receiver is highly desirable. With automatic gain control (AGC) the overall amplification of the signal is automatically reduced with increasing signal strength to apply a relatively constant level input signal to the video detector, even though the carrier signal strength may vary over a wide range. AGC tends to overcome the deleterious effects of differing signal strengths when tuning from one station to another, tends to eliminate the effects of slowly varying heater and anode energizing potentials which tend to alter the gain of the picture I-F amplifying circuits, and in addition, tends to eliminate variations caused by moving objects near the antenna system or other moving objects nearby, such as airplanes. Because the television picture signal is not symmetrical with respect to the alternating current (A.-C.) axis, it is necessary that the AGC circuit be made to respond to the peak carrier level in order to indicate carrier strength. Since deflection synchronizing pulses occupy a relatively small portion of the signal, improved noise immunity of the AGC circuit may be obtained by making the AGC circuit sensitive to the incoming signal only about the time the synchronizing pulses should appear. Keyed or gated AGC circuitry was developed for this purpose. In such a circuit arrangement, an AGC rectifier is keyed or gated on and off by keying pulses generated during the retrace portion of the horizontal line-scanning wave. As a result, the AGC rectifier output is distorted less by noise because the gated or keyed AGC circuit is sensitive only to noise coincident with the synchronizing pulses, and the basic noise immunity is increased by approximately the reciprocal of the duty factor of the keying or gating pulse. In addition, the AGC action can be made relatively fast because the increased width of the vertical synchronizing pulses is not measured by the keyed or gated rectifier.

There are known television circuit arrangements using a single triode vacuum tube for detecting the intermediate frequency signal and for deriving the automatic gain control voltage. The detecting function is performed by using the cathode-grid portion of the tube as a diode detector and the AGC function is obtained by connecting the entire electrode structure of the triode tube in peak rectifier circuitry. This combined AGC and detector circuit works very well and is used in a number of television receivers now on the market.

An object of the invention is to provide an improved triode automatic gain control video detecting circuit arrangement.

Another object of the invention is to key or gate combined automatic gain control and detecting circuitry using a single triode vacuum tube.

According to the invention a single vacuum tube having at least cathode, grid and anode electrodes is used to provide video detection and automatic gain control voltages by applying the intermediate frequency wave between the cathode and control grid electrodes to effect a diode detecting circuit. Flyback pulses are applied to the anode electrode to gate the anode-cathode circuit on during the blanking interval. Low load impedance is used in the detector circuit so that the signal applied to the grid goes considerably into the positive region by an amount depending on the signal level at the detector. The filtered anode potential is then proportional to the carrier signal strength since the anode current varies with variations in the grid potential. Preferably a high value of AGC circuit load resistor is used to reduce the plate current of the vacuum tube in order not to reduce the rectification efficiency of the grid-to-cathode circuit.

In an alternate embodiment of the invention flyback voltage pulses are applied to both the anode and control grid electrodes of the detector AGC tube with a capacitor having a value equal to the anode-grid capacitance of the tube in series with the lead to the control electrode and the AGC voltage is taken from the neutral point of the flyback pulse source, such as a tap on the horizontal output transformer in order to neutralize the differentiated anode pulse which may tend to appear in the detector output due to grid-to-anode capacity feedthrough.

In order that the practical aspects may be more fully appreciated and the invention readily put to use, an embodiment thereof, given by way of example only, will be described with reference to the accompanying drawing in which.

Figure 1:
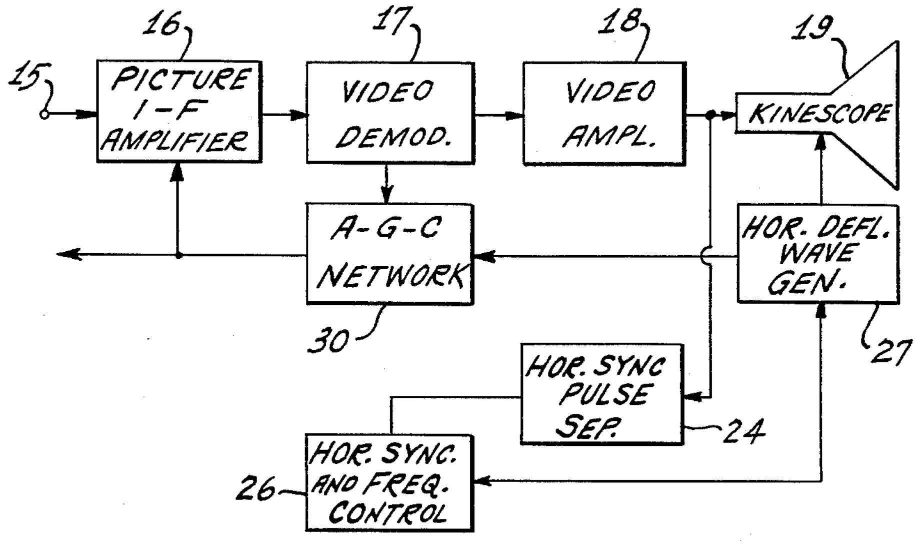
FIG. 1 is a functional diagram of portions of a television receiver to which the AGC circuitry according to the invention may be applied.

Referring to FIG. 1 there is shown a functional diagram of portions of a television receiver to which AGC circuitry according to the invention is readily applicable. Such a television receiver, for example, will otherwise comprise circuits which may be entirely conventional and which will be described to illustrate the setting of the invention. In such a receiver television signals appearing at an antenna are applied to a radio frequency wave amplifying circuit and the output therefrom is applied along with a wave obtained from a local beat oscillation generating circuit through a frequency changing circuit. The output of the frequency changing circuit is applied at input terminals 15 to a picture I-F amplifying circuit 16 which may be an individual picture I-F amplifier or one amplifying both picture and sound I-F signals. A demodulating or detector circuit 17 is coupled to the picture I-F amplifying circuit 16 for deriving a video wave from the television signals. The detected video signals are amplified in a video frequency amplifying circuit 18 and thereafter applied to the input circuit of an image reproducing device, or kinescope 19. Sound signals are derived from the frequency changing circuit, or from the I-F amplifying circuit, or from the detecting circuit 17, for further processing in a sound I-F amplifying circuit, an aural signal discriminating circuit, an audio frequency amplifying circuit and a transducer, usually in the form of a speaker. The output of the video amplifying circuit is also applied either to a combined horizontal and vertical synchronizing pulse separating circuit, or as shown to an individual horizontal synchronizing pulse separating circuit 24 and a vertical pulse separating circuit, to separate the synchronizing pulses from the image information signal and the vertical synchronizing pulses from the horizontal synchronizing pulses. The separated vertical synchronizing pulses are applied to a vertical deflection wave generating circuit and the horizontal synchronizing pulses are applied to a horizontal oscillator and frequency controlling circuit 26 connected to a deflection frequency wave generating circuit 27. A high voltage generating circuit is coupled to the horizontal deflection wave generating circuit 27. The vertical deflection generating circuit, the horizontal deflection wave generating circuit 27, and the high voltage generating circuit are coupled to the kinescope 19 to furnish the necessary vertical and horizontal deflection wave and ultor potentials. A low voltage power supply, usually connected to the local A.-C. power line, is arranged to furnish direct energizing potentials to all circuits. A gated or keyed automatic gain control AGC voltage generating and distributing network 30 is coupled to the video frequency detecting circuit 17 as shown, and the horizontal deflection wave generating circuit 27 to supply AGC voltage to the picture I-F amplifying circuit 16 and others of the circuits previously mentioned as desired. Usually the R-F and the sound I-F circuits are also at least so supplied.

Figure 2:
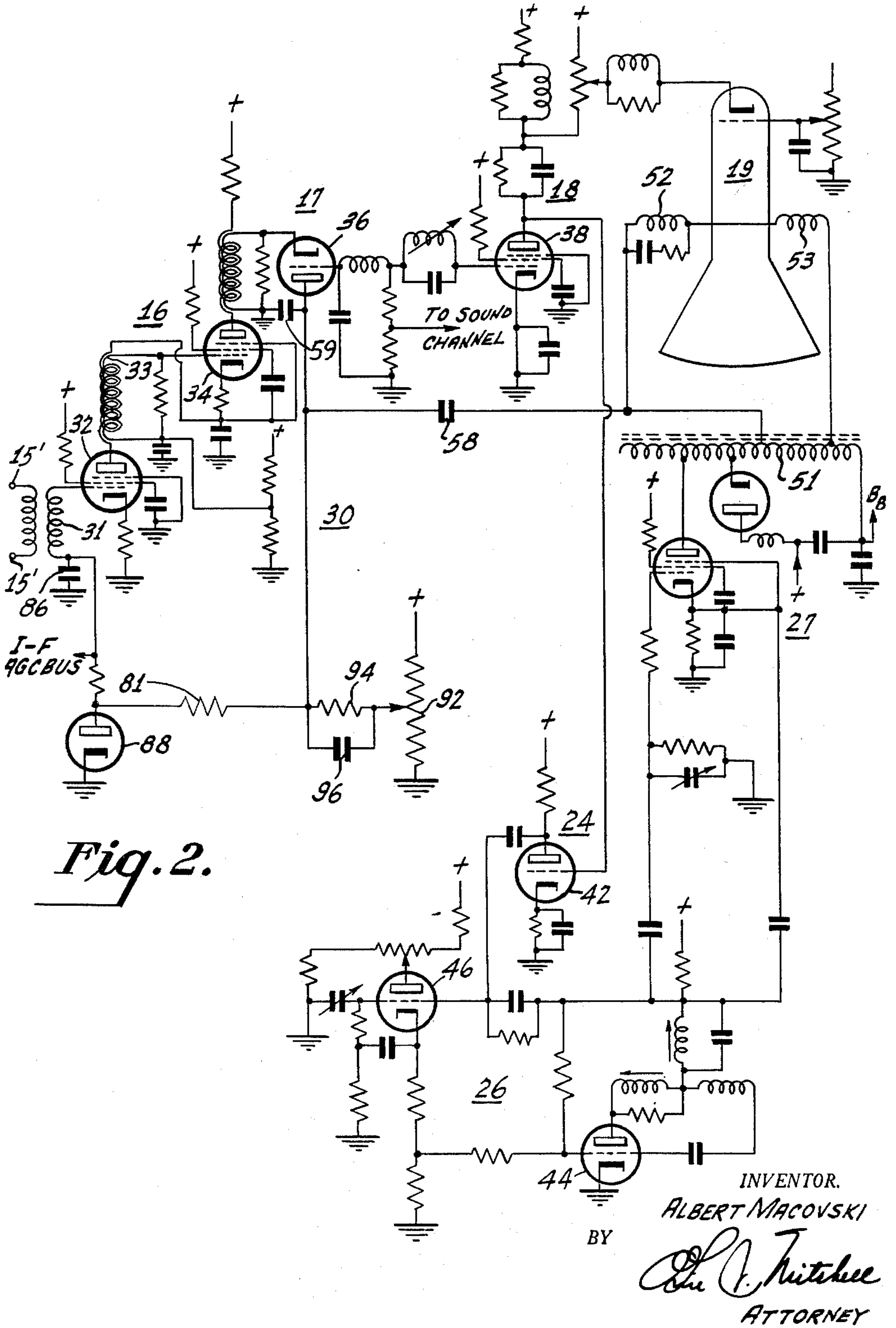
FIG. 2 is a schematic diagram of one embodiment of the invention.

A specific example of circuitry for performing the functions outlined in the diagram of FIG. 1 is shown in FIG. 2. A composite video modulated I-F wave is applied to the input terminals 15' connected to the primary of an intermediate frequency transformer having a secondary winding 31 connected to the grid of a pentode amplifier tube 32. The output of the amplifier 32 is induced in the secondary winding 33 of a bifilar I-F transformer connected to the control grid of a further I-F pentode amplifier tube 34, which tube in connection with the pentode amplifier tube 32 forms the I-F amplifying circuit 16. The composite video modulated I-F wave at the anode of the final I-F amplifying tube 34 is demodulated in the demodulating circuit 17 comprising a triode demodulator tube 34 connected to effect a diode detector between the cathode and control grid electrodes. The video frequency wave obtained at the grid of the detector tube 36 is applied, through conventional trap circuits for separating sound signals for application to the sound I-F amplifier, to the grid of a pentode video frequency amplifier tube 38 and associated components constituting the video frequency amplifying circuit 18. The amplified video frequency wave is applied through conventional circuitry between the grid and cathode of a kinescope 19. The amplified video frequency wave at the anode of the video frequency amplifying tube 38 is also applied to the grid of a horizontal synchronizing pulse separating tube 42 in the synchronizing pulse separating circuit 24. Horizontal synchronizing pulses at the anode of the separating tube 42 are applied to the grid of the control tube 46 with a resistor going to the grid of the oscillator tube 44 to provide biasing for the oscillator control tube 46, which tubes are connected in the "synchroguide" horizontal oscillator frequency control circuit 26. The sawtooth deflection wave developed in the horizontal oscillator portion of the circuit 26 is applied to the control grid of the horizontal amplifier tube 48 of the horizontal deflection wave generating circuit 27. The sawtooth current wave developed across the horizontal output amplifier tube 48 is applied through the intermediary of a transformer 51 to the horizontal deflection coils 52, 53 mounted in a yoke arranged about the neck of the kinescope 19.

The voltage pulse developed across that portion of the winding of the horizontal output transformer 51 which is connected to the horizontal deflection coils 52, 53 is applied by way of a capacitive reactance element 58 to the anode electrode of the video detector and AGC voltage generating tube 36. The voltage pulse applied to the anode of the tube 36 is developed across a capacitor 59 connected between the anode of the tube 36 and ground, which capacitor 59 together with the coupling capacitor 58 forms a voltage dividing arrangement. The connections between the anode of the detector and AGC voltage generating tube 36 and the transformer 51 are such that during the retrace portion of the deflection wave cycle a positive voltage pulse is applied to energize the AGC voltage generating portion of the tube 36 causing anode current conduction dependent upon the degree of signal swing into the positive control electrode region of the detector and AGC voltage generating tube 36. Thus the anode-cathode current of the tube is in proportion to the carrier signal strength of the received radio wave. The potential between the anode electrode of the tube 36 and ground, being directly proportional to the carrier signal strength and negative with respect to ground, is the AGC voltage applied through a filter resistor 81 and the secondary winding 31 connected to the control grid of the preceding I-F amplifying tube 32 to bias this tube inversely proportional to the signal strength. By means of the series direct current (D.-C.) connections of the two I-F amplifying stages, an AGC voltage is also supplied to the final amplifying tube 34, since the D.-C. current flow through the I-F tubes 32, 34 is the same. The grounding capacitor 86 also serves as a filter capacitor for the AGC filter network. In some instances it may be desirable to place a diode 88 across the AGC voltage source to prevent the AGC voltage from going positive on weak signals, although this expedient is not always necessary. It is also desirable to apply a few volts of positive voltage to the AGC circuit in many instances to obtain delayed AGC action, since with no signal, some AGC voltage will still be developed in the circuit arrangement according to the invention. Delay voltage may be readily obtained by the use of a potentiometer 92 connected across the low voltage power supply with the arm connected to the anode of the AGC developing tube 36 by means of a resistor 94 shunted by a capacitor 96.

The detector and AGC voltage generating tube 36 is preferably a triode as shown in the interest of simplicity. With a triode tube, electrons going to the anode during the flyback pulse period may, if the circuit is not adequately designed, reduce the rectification efficiency of the detector diode resulting in reduced output during that interval. This may be readily cured by assuring that the AGC loading resistance element be relatively high, preferably at least 0.5 or 1.0 megohm, to reduce the anode current. This high value of AGC loading is particularly feasible if the control I-F tubes are connected in series for direct current flow as shown in FIG. 2, which also minimizes I-F grid current flowing through the AGC load resistance element due to noise pulses. Alternatively the detector tube 36 may be a form of a pentode vacuum tube, which type of tube obviates the harmful anode-to-control electrode feedthrough, although this type is more expensive.

Figure 3:
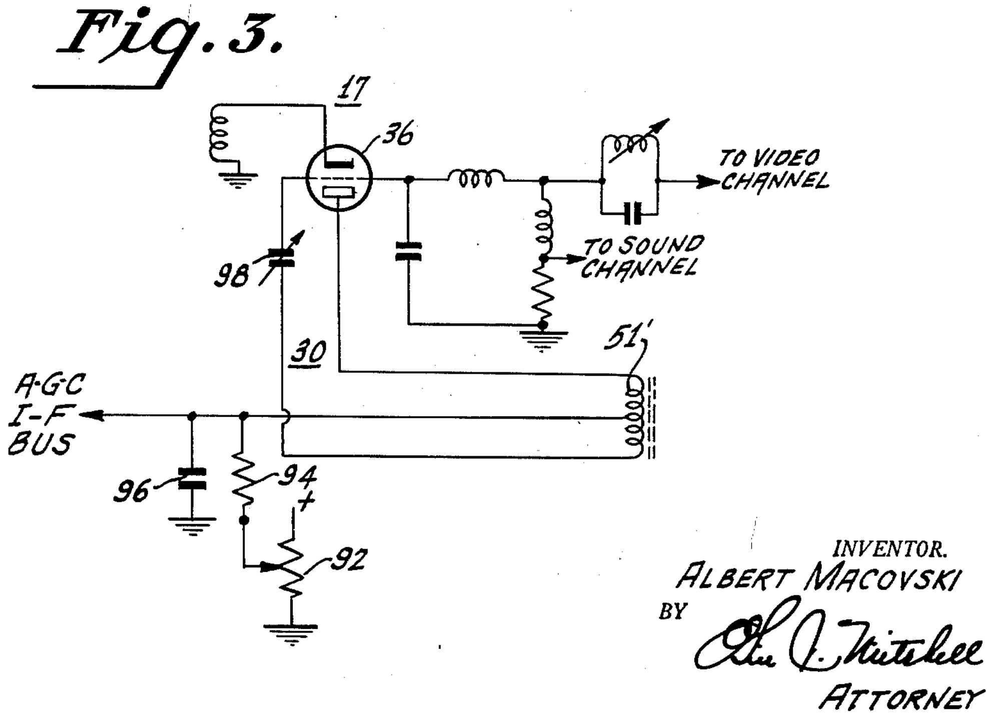
FIG. 3 is a schematic diagram of an alternate embodiment of the invention.

Alternate connections of a triode detector and AGC tube 36 are shown in FIG. 3. In this arrangement the AGC voltage is obtained from a tap on a winding 51' of the horizontal deflection wave transformer having one terminal directly connected to the anode of the AGC voltage tube 36 and having the other terminal coupled by means of a capacitive reactance element 98 to the control electrode to neutralize any differentiated pulse which would normally appear in the video channel due to the anode-to-control electrode intercapacity feedthrough. The capacitor 98 is adjusted to approximately equal value to the anode-to-control electrode intercapacity so that the voltage applied to the conrol electrode are equal and opposite in amplitude and in the proper phase relationship for complete cancellation.

Tests of an embodiment of the invention constructed along the lines shown in FIG. 2 and using the components listed below have shown that noise immunity is afforded by the application of the invention to otherwise conventional television receiver circuitry.

| Ref. No. | Component | Type or Value |
|---|---|---|
| 32 | Picture I-F tube | 6CB6. |
| 34 | Picture I-F tube | 6CB6. |
| 36 | Video demodulating tube | ½ 12AU7. |
| 38 | Video amplifying tube | 6AG7. |
| 42 | Horizontal synchronizing pulse separator tube | ½ 12AU7. |
| 44, 46 | Horizontal oscillator and control tube | 6SN7GT. |
| 48 | Horizontal output amplifying tube | 6BQ6GT. |
| 58, 59 | Coupling capacitor | 560 mmf. |
| | Divider capacitor | 0.01 mf. |
| 81, 96 | Filter resistor | 180 ko. |
| | AGC capacitor | 0.22 mf. |

The power supply used with the circuit arrangement delivered 265 volts between the points marked with the plus (+) sign and the points marked with the ground symbol. Obviously other values will be suggested by those skilled in the art for other applications of the invention.

The invention claimed is:

1. A television receiver including an electric wave amplifying circuit comprising an amplifying device having an output circuit and having an input circuit to which a video signal modulated electric wave having synchronizing pulses is applied along with direct biasing potential, a video signal demodulating circuit comprising an input element coupled to the output circuit of said amplifying device and across which said video signal modulated electric wave is developed, an electron discharge device comprising a cathode, a grid, and an anode, a video signal load device, means connecting said video signal load device and said input element between said grid and said cathode of said electron discharge device, a deflection wave generating circuit coupled to said load device and having an element across which voltage pulses appear coincident with the synchronizing pulses of said video signal modulated electric wave, means for applying said voltage pulses to said anode to effect cathode-anode current condition for the duration of said synchronizing pulses, resistance means coupled to said anode electrode for developing a potential proportional to the amplitude of said synchronizing pulses, means coupled to said potential developing means for storing a charge proportional to the amplitude of said synchronizing pulses, and means coupling said charge storing means to said input circuit of said amplifying device for augmenting said biasing potential and to vary the gain of said amplifying device inversely as the amplitude of said synchronizing pulses of said electric wave.

2. A television receiver including an electric wave amplifying circuit comprising an amplifying device having an output circuit and having an input circuit to which a video signal modulated electric wave having synchronizing pulses is applied along with direct biasing potential, a video signal demodulating circuit comprising an input element coupled to the output circuit of said amplifying device and across which said video signal modulated electric wave is developed, an electron discharge device comprising a cathode, a grid, and an anode, a video signal load device, means connecting said video signal load device and said input element between said grid and said cathode of said electron discharge device, a deflection wave generating circuit comprising a transformer coupled to said load device and having a winding across which voltage pulses appear coincident with the synchronizing pulses of said video signal modulated electric wave, means including a capacitor for applying said voltage pulses between said anode and said cathode to effect cathode-anode current conduction for the duration of said synchronizing pulses, means including a resistance element coupled to said anode electrode for developing a potential proportional to the amplitude of said synchronizing pulses, means including a capacitor coupled to said potential developing means for storing a charge proportional to the amplitude of said synchronizing pulses, and means including a resistive element coupling said charge storing means to said input circuit of said amplifying device for augmenting said biasing potential and to vary the gain of said amplifying device inversely as the amplitude of said synchronizing pulses of said electric wave.

3. A television receiver including an electric wave amplifying circuit comprising an amplifying device having an output circuit and having an input circuit to which a video signal modulated electric wave having synchronizing pulses is applied along with direct biasing potential, a video signal demodulating circuit comprising an input element coupled to the output circuit of said amplifying device and across which said video signal modulated electric wave is developed, an electron discharge device comprising a cathode, a grid, and an anode, a video signal load device, means connecting said video signal load device and said input element between said grid and said cathode of said electron discharge device, a deflection wave generating circuit including a transformer coupled to said load device and having a winding across which voltage pulses appear coincident with the synchronizing pulses of said video signal modulated electric wave, said winding having an intermediate tap thereon, means connecting said tap and another terminal on said winding between said cathode and said anode to effect cathode-anode current conduction for the duration of said synchronizing pulses, a resistance element coupled to said anode electrode for developing a potential proportional to the amplitude of said synchronizing pulses, a capacitive element coupled to said resistance element for storing a charge proportional to the amplitude of said synchronizing pulses, means coupling said capacitive element to said input circuit of said amplifying device for augmenting said biasing potential to vary the gain of said amplifying device inversely as the amplitude of said synchronizing pulses of said electric wave, and means connecting said resistance element to a point of positive potential for rendering said augmenting ineffective below a predetermined value of derived potential.

4. A television receiver including an intermediate frequency amplifier circuit including an input element across which a video signal modulated wave having synchronizing pulses is impressed, an electron discharge tube having a cathode electrode connected to one terminal of said element, a grid electrode coupled to the other terminal of said element, and an anode electrode connected for direct current flow to an output element, means for applying direct energizing potential between said cathode and the other terminal of said output element, a detector winding coupled to said output element for alternating current transfer, a combined video detector and automatic gain controlling voltage generating circuit comprising an electron discharge device having a cathode connected to one terminal of said detector winding, a grid and an anode, a load impedance element connected between said grid and the other terminal of said detector winding and across which the detected video signal is derived, a wave generating circuit coupled across said load impedance element and including a transformer having a winding across which voltage pulses are developed during the blanking intervals of said video signal, means including a capacitor connecting said transformer winding between said grid and said anode, an automatic gain control deriving resistance element having one terminal connected to the electrical midpoint of said transformer winding for direct current flow and another terminal, a capacitor shunting said resistance element, and means including a resistive element connecting said other terminal of said resistance element to a point of positive energizing potential for biasing the automatic gain control circuit to a predetermined potential level and means connecting said capacitor between the grid and the cathode electrodes of said electron discharge tube for direct current flow.

5. A television receiver including an intermediate frequency amplifier circuit including an input winding across which a video signal modulated wave having synchronizing pulses is impressed, an electron discharge tube having a cathode electrode connected to one terminal of said winding by means of a capacitive reactance element, a grid electrode connected to the other terminal of said input winding, and an anode electrode connected for direct current flow to an output winding, means for applying direct energizing potential between said cathode and the other terminal of said output winding, a detector winding coupled to said output winding for alternating current transfer, a combined video detector and automatic gain controlling voltage generating circuit comprising an electron discharge device having a cathode connected to one terminal of said detector winding, a grid and an anode, a load impedance element connected between said grid and the other terminal of said detector winding and across which the detected video signal is derived, a horizontal deflection wave generating circuit coupled across said load impedance element and including a transformer having a winding across which voltage pulses are developed corresponding in time to the synchronizing pulses of said video signal, means including a capacitor connecting said transformer winding between said grid and said anode, an automatic gain control deriving resistance component having one terminal connected to the electrical midpoint of said transformer winding for direct current flow and another terminal, and means including a resistive component connecting said other terminal of said resistance element to a point of positive energizing potential for biasing the automatic gain control circuit to a predetermined potential level, means connecting said resistance to the one terminal of said input winding, for direct current flow, and a capacitor shunting said resistance and resistive components.

6. A television receiver including an intermediate frequency amplifier circuit including an electron discharge tube having a cathode electrode, a grid electrode and an anode electrode, means to impress a video signal modulated wave having synchronizing pulses between said grid and cathode electrodes, a combined video detector and automatic gain controlling voltage generating circuit comprising a detector winding coupled between said anode and said cathode electrodes for alternating current transfer, an electron discharge device having a cathode connected to one terminal of said detector winding, a grid and an anode, a load impedance element connected between said grid and the other terminal of said detector winding and across which the detected video signal is derived, means coupled across said load impedance element for developing voltage pulses during the blanking intervals of said video signal, means for applying said voltage pulses to aid anode for energizing said electron discharge device during said voltage pulses, an automatic gain control deriving resistance element having one terminal connected to said anode for direct current flow and the other terminal connected for direct current flow to the cathode of said electron discharge device, a capacitor shunting said resistance element, and means for connecting said capacitor for direct current flow between the grid and cathode electrodes of said electron discharge tube in opposition to the impressed video signal modulated wave.

7. A television receiver including an intermediate frequency amplifier circuit including an input element across which a video signal modulated wave having synchronizing pulses is impressed, an electron discharge tube having a cathode electrode coupled to one terminal of said element, a grid electrode connected to the other terminal of said element, and an anode electrode connected for direct current flow to an output element, means for applying direct energizing potential between said cathode and the other terminal of said output element, and a detector winding coupled to said output element for alternating current transfer, a combined video detector and automatic gain controlling voltage generating circuit comprising an electron discharge device having a cathode connected to one terminal of said detector winding, a grid and an anode, a load impedance element connected between said grid and the other terminal of said detector winding element and across which the detected video signal is derived, a wave generating circuit coupled across said load impedance element for developing voltage pulses corresponding in time to the synchronizing pulses of said video signal, means comprising a capacitor connected between said voltage pulse generating circuit and said anode for energizing said electron discharge device during said voltage pulses, an automatic gain control deriving resistance element having one terminal connected to said anode for direct current flow and the other terminal connected for direct current flow to the cathode of said electron discharge tube, a capacitor shunting said resistance element, and a resistive element connecting said one tetrminal of said resistance element to said one terminal of said input element.

8. A television receiver including an intermediate frequency amplifier circuit including an input winding across which a video signal modulated wave having blanking intervals is impressed, an electron discharge tube having a cathode electrode connected to one terminal of said winding by means of a capacitive reactance element, a grid electrode connected to the other terminal of said input winding, and an anode electrode connected for direct current flow to an output winding, means for applying direct energizing potential between said cathode and the other terminal of said output winding, a detector winding coupled to said output winding for alternating current transfer, a combined video detector and automatic gain controlling voltage generating circuit comprising an electron discharge device having a cathode connected to one terminal of said detector winding, a grid and an anode, a load impedance element connected between said grid and the other terminal of said detector winding and across which the detected video signal is derived, a horizontal deflection wave generating circuit coupled across said load impedance element for developing voltage pulses during the blanking intervals of said video signal, means comprising a pair of capacitors connected in series between said other terminal of said detector winding and said voltage pulse generating circuit with the junction connected to said anode for energizing said electron discharge device during said voltage pulses, an automatic gain control deriving resistance element having one terminal connected to said anode for direct current flow and the other terminal connected for direct current flow to the cathode of said electron discharge device, a capacitor shunting said resistance element, another resistive element connecting said one terminal of said resistance element to said other terminal of said input winding, and means connecting said other terminal of said resistance element to a point of positive energizing potential for biasing the automatic gain control circuit to a predetremined potential level.

References Cited in the file of this patent

UNITED STATES PATENTS

| | | |
|---|---|---|
| 2,300,942 | Lewis | Nov. 3, 1942 |
| 2,402,096 | Somers | June 11, 1946 |

OTHER REFERENCES

Rider's Television Manual, vol. 7, Philco TV, page 7–56. Copyrighted 1951. Copy in Scientific Library.